May 25, 1965   W. H. GLAZIER   3,185,250
SEISMIC PULSE GENERATOR
Filed Nov. 25, 1959   5 Sheets-Sheet 1

Walter H. Glazier   Inventor
By John D. Gassett   Attorney

May 25, 1965 W. H. GLAZIER 3,185,250
SEISMIC PULSE GENERATOR
Filed Nov. 25, 1959 5 Sheets-Sheet 2

Walter H. Glazier    Inventor
By *John D. Gassett*    Attorney

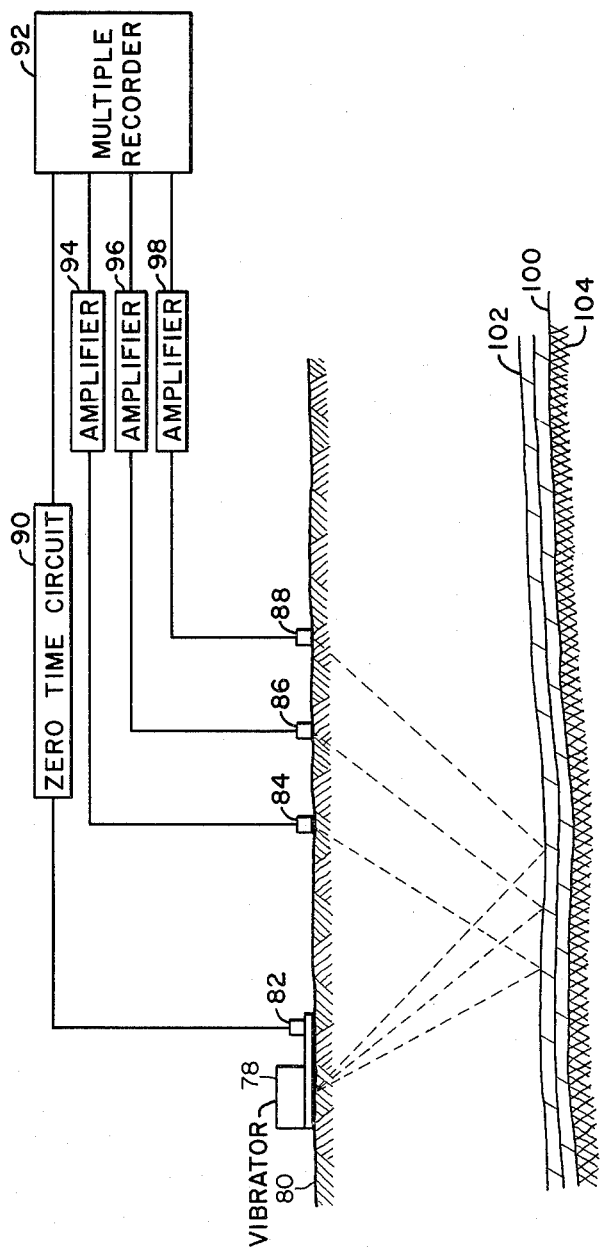

United States Patent Office 3,185,250
Patented May 25, 1965

3,185,250
SEISMIC PULSE GENERATOR
Walter H. Glazier, Calgary, Alberta, Canada, assignor, by mesne assignments, to Esso Production Research Company
Filed Nov. 25, 1959, Ser. No. 855,322
18 Claims. (Cl. 181—.5)

This invention relates generally to the art of geophysical exploration using artificial seismic waves. It is particularly concerned with an apparatus and system for generating seismic pulses.

Geophysical prospecting using artificially induced seismic disturbances has found wide application in the search for petroleum and other products. It is the general practice to initiate a seismic disturbance at a point near the surface of the earth to direct seismic waves downward into the earth from that point. The waves continue to travel downward within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal which is in effect a composite signal made up of a plurality of electrical signals varying in frequency and amplitude.

The artificially induced seismic disturbance has most frequently been produced by initiating an explosion such as dynamite in a shot hole drilled in the surface of the earth. This has certain drawbacks including the hazard of handling the explosives and also the cost of such explosives and the drilling of shot holes. Recently, interest has been shown in the industry in mechanical type seismic transducers. One such mechanical device consists simply in raising a large mass a distance above the surface of the earth and dropping it; the force with which the weight or mass strikes the earth induces the seismic disturbance. This system although having some merit has the disadvantage of being difficult to transport because of its great weight. The methods of detonating an explosive and dropping a weight are both effective but the operator has almost no control over the frequency, phase or amplitude of the components which go to make up the downtraveling pulse. Mechanical vibrators have also been suggested for possible use in inducing seismic disturbances; however, known mechanical vibrators do not readily produce the desired type seismic disturbance. It is thus clear that there is a need for a system in which a seismic pulse can be generated in which the frequency, phase and amplitude are all known and can be individually controlled. Such a system is disclosed herein.

Briefly, the seismic generator of this invention includes a plurality of pairs of rotatable eccentric weights, i.e., the center of mass of each weight is different from its axis of rotation. Means are provided (1) to counter rotate the weights of each pair, and (2) to rotate different pairs of eccentric weights at different frequencies.

The eccentric weights of each pair are substantially equal and are so timed in their opposing rotation so as to cancel the centrifugal force of each other in the horizontal plane and to add such forces in the vertical plane. All the centers of mass of eccentric weights travel approximately in one direction at one instant in time but in approximately different directions at all other times within a repetition period of the seismic wave. When traveling in the same direction the centrifugal forces add; when traveling in opposite directions the forces cancel. The largest amplitude of the elastic wave is generated when all of the eccentric weights are in phase and it is this part of the elastic wave which is used in seismic prospecting for underground structures. This maximum signal is called a seismic pulse herein. Any desired phase, amplitude, and/or frequency may be obtained by proper selection of the eccentric weights, the frequency of rotation of each pair of eccentric weights, the difference in frequency between pairs of eccentric weights, the centrifugal force produced by each eccentric weight, and the total number of such eccentric weights.

A better understanding of this invention and its objects will be apparent from the following description taken in conjunction with the accompanying drawings in which.

Figure 4A:
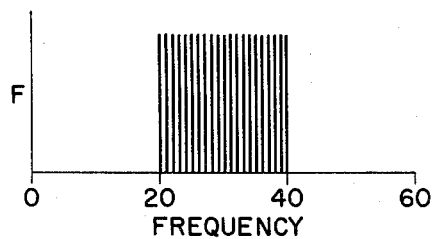
Figure 4B:
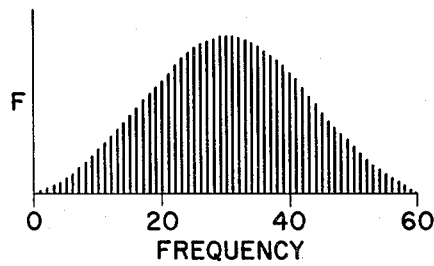
Figure 5:
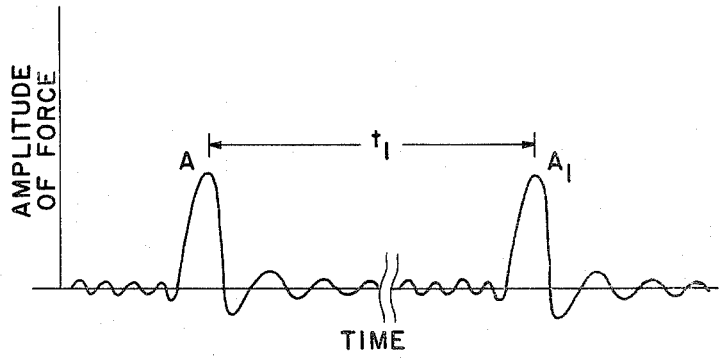

FIG. 4-a illustrates one frequency-force spectrum and FIG. 4-b illustrates another frequency-force spectrum;

FIG. 5 illustrates one type waveform which may be generated by this device; and, FIG. 6 shows a cross-section of the earth and illustrates schematically an arrangement for generating, detecting and recording seismic waves.

Figure 1:
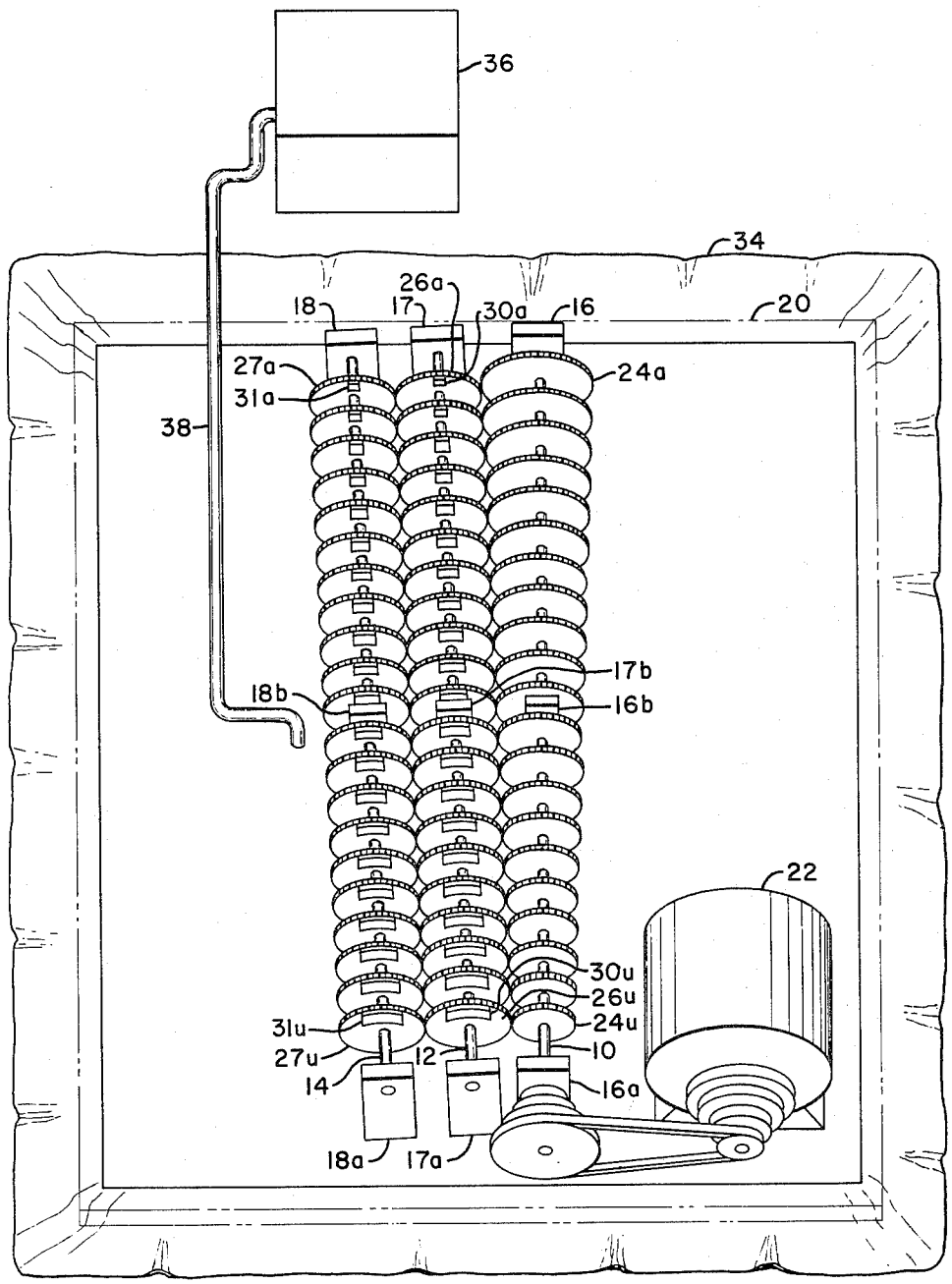
FIG. 1 illustrates in schematic form one embodiment of a seismic pulse generator and including means for holding the generator to the ground.

Referring to the drawing and FIG. 1 in particular, there is illustrated a preferred embodiment illustrating the best mode contemplated for carrying out the invention. Shown in FIG. 1 are shafts 10, 12, and 14. The shafts are supported in substantially a horizontal plane at one end by rigid support members 16, 17, and 18 respectively, and at the other end by rigid support members 16-a, 17-a, and 18-a. Support members 16-b, 17-b, and 18-b are also preferably provided midway shafts 10, 12, and 14. These support members are attached to and supported from a rigid base member or plate 20. A motor 22 is mounted on base member 20 and drives shaft 10 by any suitable driving means. The ratio of the frequency of rotation of the shaft of motor 22 to the frequency of rotation of shaft 10 can be varied as by varied pulley arrangements as shown or by other means.

Mounted on drive shaft 10 are a plurality of drive gears 24-a through 24-u, inclusive, of varying diameters. In the embodiment illustrated the gears vary from the largest 24-a and progressively decrease in size through 24-u. These drive gears are keyed or otherwise fixed to shaft 10 and therefore rotate at the same frequency as shaft 10. As illustrated, the largest drive gear is illustrated as being adjacent support member 16 and gradually and uniformly reducing sequentially in size to gear 24-u at the opposite end of shaft 10 near support member 16-a. Rotatably mounted on shaft 12 are a plurality of gears 26-a through 26-u which have eccentric weights 30-a through 30-u inclusive. Gears 26-a through 26-u are all of the same diameter and mesh with the drive gears on shaft 10. In the arrangement shown in FIG. 1 the gear which turns the fastest, that is, 26-a has a smaller weight 30-a than the other gears. It will be seen hereinafter that in one preferred embodiment the eccentric weights are such that the force generated by each rotating eccentric weight is the same or equal.

Rotatably mounted on shaft 14 are a plurality of eccentrically weighted gears 27-a through 27-u having eccentric weight 31-a through 31-u. The gears and weights on shaft 14 are substantially identical to and mesh with those on shaft 12. The gears on shaft 10 are fixed thereto and are driven by motor 22. As shaft 10 is rotated the eccentrically weighted gears will rotate at many different frequencies due to the differences in the gear diameters of the driving gears on shaft 10. The weights are arranged so that they will all be traveling in essentially one direction at one time but in essentially different directions at other times. When they are traveling in the same direction, the centrifugal forces add but when traveling in an opposite direction the forces cancel. The only forces that are generated are vertical inasmuch as horizontal forces are cancelled as the meshing gears with the eccentric weights on shaft 12 and 14 are always rotating in opposite directions about horizontal axis. It will, of course, be understood that the centers of mass of meshing eccentrically weighted gears are positioned so that this is true. Vertical downward pulses are then generated as the forces of the various sets of eccentrically weighted gears come into phase. Any desired phase, frequency and amplitude for a seismic pulse may be obtained by proper selection of gear ratios, eccentric weights, speed of rotation, effective radius of rotation of the eccentric weights and the total number of gears.

An examination of the device illustrated in FIG. 1 shows that shafts 12 and 14 are parallel and that shaft 10 is not completely parallel to shaft 12. A small deviation of shafts 12 and 10 from being parallel is permissible so long as adequate meshing of driving and driven gears occur. The maximum deviation of shaft 10 from a position which would be parallel to shaft 12 should normally not be over about 5 degrees for most effective use of spur gearing between meshing driving and driven gears. The deviation will be determined by the length of shafts 10 and 12 and the relative size of the gears on drive shaft 10.

The gears shown on shaft 10 are all keyed to a common shaft and rotate at a common frequency. The gears on shaft 12 all rotate independently of each other and are driven by their respective meshing gears on shaft 10. In one arrangement of the embodiment illustrated in FIG. 1 which has been built and used, the driven gears have 60 teeth each and the driving gears 24–$u$ through 24–$a$ have 40 to 80 teeth in steps of 2 teeth between adjacent gears. The frequency of eccentric weights 31–$a$ through 31–$u$ and 30–$a$ through 30–$u$ is therefore $$\frac{80F}{60}$$

$$\frac{78F}{60}$$

and so forth down to $$\frac{40F}{60}$$

where F is the frequency of the driving gears 24–$a$ through 24–$u$ which are all of the same frequency. Many other arrangements can, of course, be used as desired. When the shaft 10 is rotated 30 revolutions per second the gears on shaft 12 and 14 are then seen to be designed in relation to the gears on shaft 10 so that gears 26–$a$ through 26–$u$ on shafts 12 and gears 27–$a$ through 27–$u$ on shaft 14 are rotated at 40, 39, 38 etc. to 20 revolutions respectively, per second.

It is not intended to limit this invention to any particular arrangement, however, in the device shown in FIG. 1, it has been found that a pulse can be obtained which is repeated at regular intervals in a reasonable length of time for seismic operations by arranging the gear sizes such that the difference between frequencies of any adjacent gears are of equal value or multiples of such equal value. It has also been found that in the embodiment illustrated in FIG. 1 that the frequency of repetition of pulses is the reciprocal of the difference in frequency between adjacent gears. Therefore, the system illustrated in the preceding paragraph has a frequency difference of one cycle per second between adjacent gears and one seismic pulse will be generated per second. Between the seismic pulses the forces will nearly cancel and the waveform is generated similar to that illustrated in FIG. 5. Seismic pulses A and $A_1$ will be of considerable force as will be shown.

The distance between seismic pulses A and $A_1$ as represented by the time $t_1$ in FIG. 5 can be increased by reducing the difference in frequency between adjacent eccentrically weighted gears. If the difference in frequency between adjacent gears of FIG. 1, for example, is ¼ cycle per second, then, the repetition rate will be one pulse every four seconds. By frequency it is meant, for convenience herein, to be the rotational speed of gears, for example, in cycles of revolutions per second.

The eccentric weights on shaft 12 are of such a size that the centrifugal force developed by the individual weights are of the same magnitude (for this illustration). This is accomplished by having the weights smallest on the gears that rotate the fastest. This force spectrum is illustrated by the line spectrum of FIG. 4–$a$ between frequency 20 and 40 having a constant force F. It will, of course, be understood that any other spectrum desired may be arranged by varying either the offset mass or the effective radius so as to form other spectrums such as that illustrated by the lines in FIG. 4–$b$. It is easy to change the spectrum and waveform of the seismic signal by simply changing the speed of rotation of drive shaft 10 in FIG. 1, for example. By adding successive signals, then, it is possible to obtain an effective continuous spectrum of the one signal line spectrum. The arrangement of gears on shaft 14 both as to the size of the gears and the size of the weight and the position of the weight is the same as those on shaft 12. Therefore, the two sets of gears are counter rotating. By proper or symmetrically spacing of the eccentric weights with respect to a vertical plane halfway between shafts 12 and 14, the horizontal component of the centrifugal force is zero at all times.

The eccentric weights as arranged in FIG. 1 are nearly in phase; therefore, the total centrifugal force exerted by the system is near maximum. As the system rotates, the weights will be widely separated in phase and the total resulting force is very small.

The device shown in FIG. 1 is capable of developing great forces. The force of each eccentrically weighted gear can be calculated by the following formula:

$$F = m\omega^2 r$$

in which $m$ equals the offset mass, $\omega$ equals $2\pi f$ ($f$=frequency of rotation) and $r$ is the effective radius of the offset mass, that is, the distance between the center of rotation and the center of gravity. Assume, for example, that gear 26–$a$ has an offset mass of two pounds, a frequency of 30 cycles per second, and an effective radius of three inches. By calculations this gives a force of approximately 600 pounds. Assuming the eccentric weights are of such a size and arranged such that the centrifugal force developed by the individual weights are of the same magnitude, then, each of the 42 gears would develop 600 pounds. When all the gears are in phase this generates a seismic pulse having a total force of approximately 25,000 pounds. The centrifugal force for all eccentric weights can be kept the same by letting $mr$ vary proportionally to $1/\omega^2$.

The shape of seismic pulse A can be varied by changing the relative size of the individual harmonic components. It is, of course, understood that many changes and modifications may be made to obtain any desired pulse having any repetition rate $t_1$. For example, the shape of the pulse can be varied by changing the relative size of the weights. This changes the frequency spectrum of FIG. 4–$a$. The frequency components of a pulse can be varied by changing the rotational speed of drive shaft 10. This will, of course, change the repetition rate.

As the vertical forces do not cancel at all times but add when in phase there will be a tendency for the device to move upward away from the earth especially at the maximum upward vertical component. Therefore, it is normally desirable that some means be provided to prevent the upward movement of the device. A preferred way of holding the device on the ground, which utilizes atmospheric pressure, is utilized in FIG. 1.

Base plate 20 is placed upon the surface of the earth. The edges of base plate 20 are sealed to the earth by any convenient method such as placing mud or clay around the base or by an elastic apron 34 as shown. In another means a thin, sharp edged rim may be provided on the outer lower periphery of plate 20 which would be forced into the earth by the weight of the device, then, forming a seal between the underside of plate 20 and the atmosphere. A vacuum pump 36 having suction line 38 is conveniently used to create a vacuum or a partial vacuum between the bottom of plate 20 and surface of the earth. By the producing or creating a small or partial vacuum beneath plate 20 the atmospheric pressure prevents the bottom plate from moving away from the surface of the ground. For example, if the atmospheric pressure beneath plate 20 is reduced by 10 p.s.i., a pressure differential of 1,440 pounds per square foot is exerted on the plate. A 5 x 10 foot platform, then, would resist upward pressure of an excess of 70,000 pounds.

Figure 3:
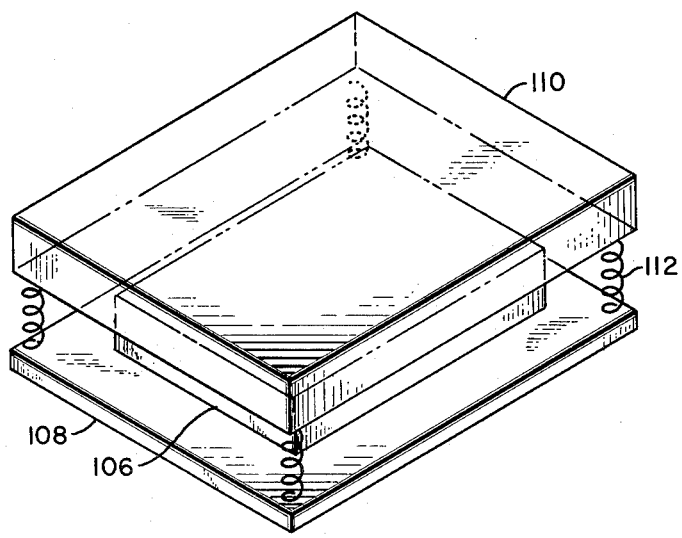
FIG. 3 illustrates another means for holding the seismic pulse generator to the surface of the earth.

FIG. 3 illustrates another means for holding the apparatus to the ground. In that figure, the seismic generating system is illustrated in block form as 106 mounted upon a platform 108. A mass 110 is shown resiliently supported from platform 108 by resilient means such as springs 112. The resonant frequency of this mass spring system is determined by the following formula:

$$f_r = \frac{1}{2\pi}\sqrt{\frac{K}{M}}$$

in which $f_r$ equals the resonant frequency, K is the effective force constant of all the springs and M is the mass 110 which should be approximately the same magnitude as the maximum upward force generated. The mass and springs are so selected that the resonant frequency is less than frequencies generated by the seismic generating unit 106. With this arrangement, the large mass M exerts a static downward force on the seismic generator but does not influence its dynamic response.

Figure 2:
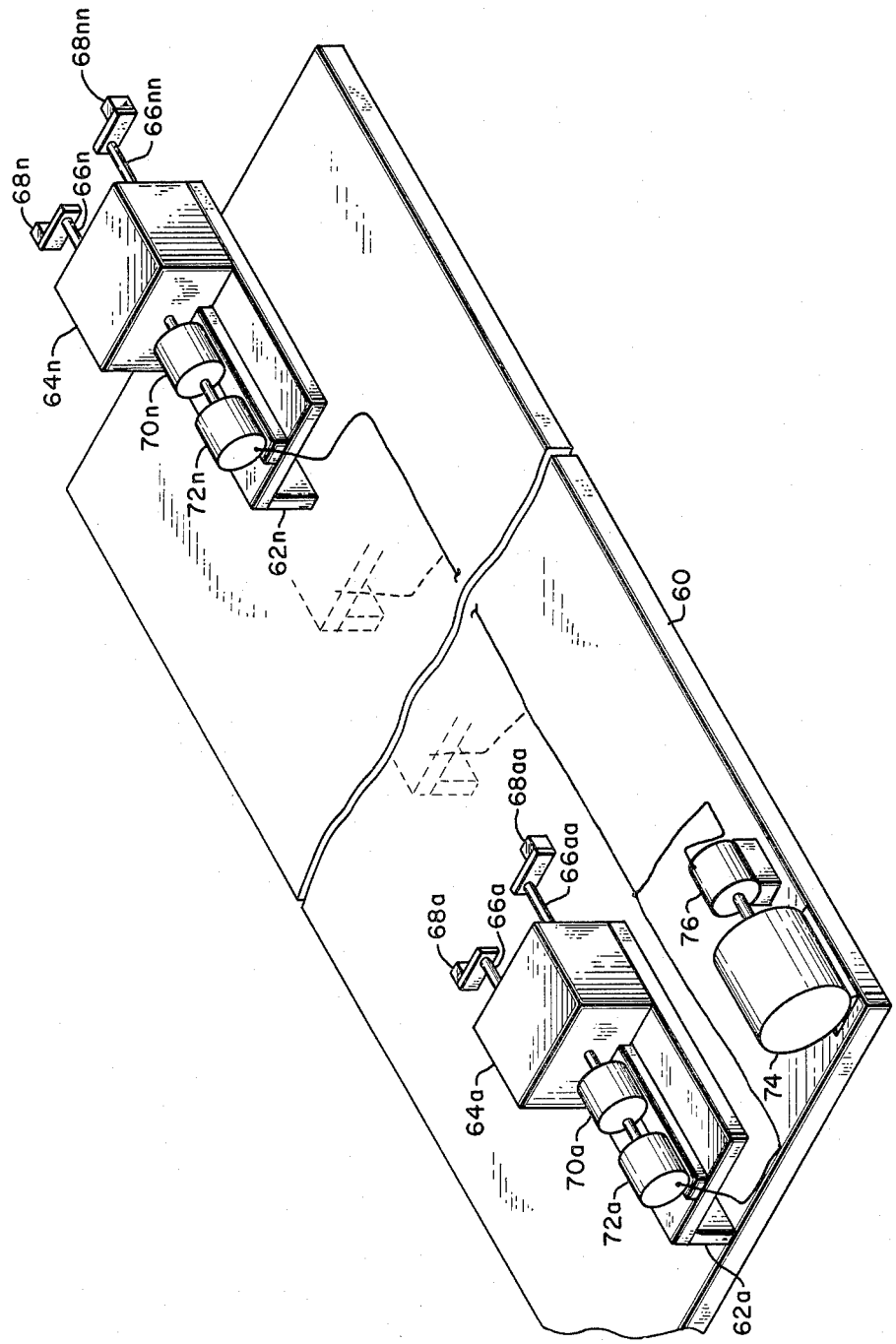
FIG. 2 illustrates another embodiment of this invention.

Referring now to FIG. 2 another embodiment of an apparatus of this invention is illustrated. Illustrated thereon is a rigid platform or frame 60. Extending upwardly from platform 60 are a plurality of supporting members 62–a through 62–n. There are only two such supporting members illustrated in FIG. 2, however, any desired number may be added thereto as is necessary for producing a selected seismic pulse or waveform. Mounted on each supporting member is a pair of similar rotatable eccentric weights. Means are also provided to rotate the eccentric weights mounted on support member 62–a at a frequency different from that of the other eccentric weights on other support members. Means for accomplishing this will be apparent from the following description.

Mounted on platform 60 is a motor 74 which provides a reference frequency for the rotation of all of the eccentric weights. Selsyn transmitter 76 is connected to motor 74. The output of selsyn transmitter 76 is connected to a selsyn receiver 72–a mounted on support member 62–a. Motor and gear box 64–a and selsyn control 70–a are also mounted on support member 62–a. Selsyn receiver 72–a is coupled to selsyn control 70–a which in turn is coupled to the motor and gear box 64–a. This control system provides for the rotation of the motor of motor and gear box 64–a to be rotated at a speed or frequency in accordance with the reference frequency of motor 74. Suitable gears are provided for converting the rotation of the motor of motor and gear box 64–a to give the desired frequency to shafts 66–a and 66–aa which are supported by the motor and gear box 64–a. The gearing arrangement is also such that shaft 66–a is counter rotating to shaft 66–aa. Such gearing arrangements are well known or apparent to those skilled in the art. Eccentric weight 68–a is mounted on shaft 66–a and eccentric weight 68–aa is mounted on shaft 66–aa. The eccentric weights are mounted on these two shafts in such a manner as to cause cancellation of horizontal components of the centrifugal force. Shafts 66–a and 66–aa are thus arranged to be substantially parallel to each other and to base platform 60. The plane of rotation for eccentric weight 68–a should be substantially the same as for weight 68–aa.

Mounted on support member 62–n is a similar unit to that described as mounted on support member 62–a except that a different gearing arrangement is provided so that the eccentric weights of the unit associated with the support members 62–n is different from that supported by support member 62–a. Selsyn receiver 72–n and selsyn control 70–n function to control the speed of the motor of motor and gear box 64–n. Supported from gear box 64–n are shafts 66–n and 66–nn having mounted thereon eccentric weights 68–n and 68–nn which are counter rotating similarly to weights 68–a and 68–aa. Gear box 64–n has gearing such that shafts 66–n and 66–nn rotate at a frequency different from that of shafts 66–a and 66–aa. While only two sets of counter rotating eccentric weights are illustrated in FIG. 2 it is obvious that any number may be used. The eccentric weight on each gear box rotates at its own fixed frequency and may be phased to represent any harmonic components of a seismic waveform which is desired to be produced. The arrangement of pairs of eccentric weights is preferably in a straight line centered on the platform illustrated in FIG. 2 with the axis of rotation the same height. However, other arrangements may be made provided adequate care is taken in such design to assure that excessive unbalancing torques are not imparted to the platform of the seismic generating unit.

The amplitude may be varied in a manner hereinbefore described. It is thus seen that all of the eccentric weights in the device illustrated in FIG. 2 rotate about horizontal axes and are so arranged such as to cancel the horizontal components of the centrifugal forces. The eccentric weights travel in one direction at one time but in different directions at other times. When the weights are traveling in the same direction the centrifugal forces add; when traveling in opposite directions the forces cancel. Seismic pulses then are generated as the forces come into phase.

In some operations, especially if the length of the base member or plate is short, there is the possibility that the effective vertical forces on the ends may come in phase such that a tendency toward "rocking" is developed. This can readily be overcome. For example, the device shown in FIG. 1 may be "modified" by adding a second unit rigidly thereto in a manner such that the shafts of the two units are essentially aligned and the gearing, frequency, etc. are reversed as in a mirror image. Another modification is to place one vibrating unit such as shown in FIG. 1 on top of another with the position of the gears reversed and the shafts of each unit essentially parallel. In FIG. 2 the eccentric weights having the lowest frequency may be placed at one end of the base, the weight having the second lowest frequency at the other end, the weights having the third lowest frequency near to the weight having the lowest frequency, etc.

The system disclosed herein may be used for generating essentially any waveform desired. It is first desirable to determine the harmonic time components of the desired waveform. If the desired waveform is capable of mathematical expressions, then, it may be examined mathematically, such as by the Fourier series, to determine the harmonic time components thereof. If the waveform is obtainable only in the form of a plotted graph, graphical means of harmonic analysis may be used. Various means of harmonic analysis has been devised, of which the Fisher-Hinnen method is convenient in ordinary cases.

After the harmonic time components have been determined the seismic generator is supplied with a pair of oppositely rotating eccentric weights of the proper size, phase, and frequency to generate that harmonic. A separate pair of oppositely rotating eccentric weights will be provided for each harmonic component desired or necessary to approximate the desired waveform. The axis of rotation of each eccentric weight is rigidly supported from a common rigid base member. Means are provided to rotate the individual pair of eccentric weights at the required speed. This is conveniently done in the apparatus, for example, in FIG. 1 by designing the relative size of gears on shaft 10 such that when shaft 10 is rotated at a given speed, the meshing gears on shaft 12 and 14 are rotated at the required frequency. The centrifugal force of the rotating of eccentric weights may be varied or held constant by controlling $mr$ in relation to $\omega^2$ as hereinbefore described.

Many factors go into deciding what type waveform is to be generated in seismic prospecting. For example, if the frequency band of interest for transmitting a seismic wave for a given area is determined to be 20 to 40 c.p.s., the center of that frequency band which is 30 c.p.s. is normally the frequency of rotation of the middle eccentric weights, i.e., there is an approximately equal number of eccentric weights rotating above 30 c.p.s. as below 30 c.p.s. It is thus desirable to determine the band width. In general, the thickness of the beds beneath the surface of the earth will be a major factor in determining the width of the band or frequency spectrum. For example, if thin beds of interest are likely to be encountered, a relatively wider band or spectrum will be desired. This is so inasmuch as usually the wider the band or spectrum the shorter the duration of the seismic pulse. A seismic pulse of short duration aids resolution in thin bed areas. This permits arrivals from the top and bottom of such thin beds, for example, to be detected more readily as there will be less chance for overlap of reflections from the top of the bed and reflections from the bottom of the bed.

Attention will now be directed toward FIG. 6 which shows a schematic system for the use of this seismic generating system in geophysical exploration. A generating unit 78 of the character described herein is placed upon the surface of the earth 80. Mounted on the frame of generating unit 78 is a geophone 82 which is electrically connected to a zero time circuit 90. Zero time circuit 90 is of a character to emit a sharp pulse indicative of the beginning of each seismic pulse generated such as pulse A in FIG. 5. The output of zero time circuit 90 is electrically connected to multiple recorder 92. Geophones 84, 86, and 88 are placed upon the surface of the earth and are spaced from the generating unit 78. Of course, any number of geophones and geophone arrays can be used, but only three are shown here which is sufficient for illustration. Each of the geophones 84, 86, and 88 are electrically connected to amplifiers 94, 96, and 98 respectively. The output of these amplifiers are electrically connected to multiple recorder 92. Multiple recorder 92 may be, for example, a magnetic recording means such as magnetic tape mounted on a revolving drum in a manner well known.

In the operation of this system before starting up the generating unit 78 it is normally desired to seal the frame thereof to the surface of the earth and generate a partial vacuum underneath the frame and between the surface of the earth as hereinbefore described. After the desired number of geophones have been placed in position and connected to the multiple recorder 92 the seismic generating unit 78 is started. Upon generating a seismic pulse such as indicated as A in FIG. 5, a seismic waveform passes through the earth until encounters discontinuities such as the interface 100 between strata 102 and 104. When the seismic pulse is generated geophone 82 transmits a relatively large signal to zero time circuit 90 which causes that circuit to pass a time pulse to multiple recorder 92. This time pulse is recorded thereon and gives information as to the relative time when the seismic pulse was generated. As the seismic pulse reaches interface 100 a part of the wave is reflected back toward geophones 84, 86, and 88 where it is detected and translated to electrical impulse energy. This electrical energy is then amplified and recorded on multiple recorder 92. The record made on multiple recorder 92 may then be processed and interpreted in a manner well known to those skilled in the art such as applying various correction factors, etc.

While there are above disclosed but a limited number of embodiments of the system of the invention herein presented, it is possible to produce still other embodiments without departing from the inventive concept herein disclosed. It is therefore desired that only such limitations be imposed on the appending claims as are stated therein.

What is claimed is:

1. A waveform generator for imparting seismic shock to the earth comprising in combination: a first shaft and a second shaft spaced apart from one another in substantially parallel relationship; a plurality of eccentrically weighted gears of equal size rotatably mounted on each of said first and second shafts; the shafts being spaced such that the gears on each shaft mesh with the gears on the other shaft forming pairs of meshing matching eccentrically weighted gears; a third shaft having a plurality of driving gears mounted thereon, said driving gears linearly varying in diameter from its smallest gear to its largest gear, said third shaft being spaced from said first shaft and said driving gears mounted thereon such that said driving gears mesh with the gears on said first shaft; supporting means for rigidly supporting said shafts; and means to rotate said third shaft whereby each pair of said eccentrically weighted gears rotate at a speed proportional to the size of its driving gear.

2. An apparatus as defined in claim 1 in which said supporting means includes a flat plate of a character to rest upon the earth.

3. An apparatus as defined in claim 2 in which sealing means are provided between the periphery of said plate and the earth.

4. An apparatus as defined in claim 3 in which means are provided to produce a partial vacuum under said plate.

5. An apparatus as defined in claim 1 in which the eccentrically weighted gears are weighted such that the gears meshing with the driving gears of smallest diameter have the largest eccentric weight and the pair of meshing gears meshing with the largest of the driving gears have the smallest eccentric weight such that equal force is generated by each driven gear.

6. An apparatus as defined in claim 1 in which the difference in size between any two adjacent driving gears is the same.

7. A waveform generator for imparting seismic shock to the earth comprising in combination: two substantially horizontal shafts spaced apart from one another in substantially parallel relationship; a plurality of eccentrically weighted gears rotatably mounted on each of said shafts, each of said gears having an equal number of teeth and being of the same diameter, the shafts being spaced such that the gears on each shaft mesh with the gears on the other shaft forming pairs of meshing gears; means to rotate each pair of said gears at a different preselected rotational speed; and a supporting means rigidly supporting said shafts.

8. An apparatus as defined in claim 7 in which said supporting means includes a flat plate of a character to rest upon the earth.

9. An apparatus as defined in claim 8 in which sealing means are provided between the periphery of said plate and the earth.

10. An apparatus as defined in claim 8 in which means are provided to produce a partial vacuum beneath said plate.

11. An apparatus as defined in claim 7 with the addition of a mass M and resilient means supporting said mass from said supporting member such that the resonant frequencies of the mass M is less than the frequencies of the generated waveform and the mass is of approximately the same magnitude of force as the maximum upward force generated.

12. A seismic waveform generator comprising in combination: a first pair of similar rotatable eccentric weights having substantially parallel axes in a horizontal plane, means coupled to said first pair to counter rotate the eccentric weights of said pair in substantially the same plane; a second pair of similar rotatable eccentric weights having substantially parallel axes in a horizontal plane; means coupled to said second pair to counter rotate the second pair of rotatable eccentric weights in substantially the same plane at a frequency different from the rotational frequency of said first pair; and a rigid base member supporting each eccentric weight such that its axis of rotation is fixed with respect to said base member.

13. An apparatus as defined in claim 12 in which means are provided to resist upward movement of said generator from the surface of the earth which includes having a base member which is essentially impermeable to air; means to seal the edges of said member with the surface of the earth, and means to generate a partial vacuum between said member and the surface of the earth.

14. A method of generating a seismic pulse using a plurality of pairs of rotatable eccentric weights in which each weight of each pair are rotatable about horizontal parallel axes which are rigidly connected to a base member which comprises: rotating the eccentric weights of each pair counter to each other; and rotating each pair of eccentric weights at a frequency different from that of any other pair.

15. A seismic waveform generator comprising in combination: a first pair of parallel axes in a horizontal plane; a first arm on one of said first pair of axes and a second arm on the other of said first pair of axes; first and second eccentric weights of equal size on said first arm and second arm respectively; a second pair of parallel axes in a horizontal plane; a third arm on one of said second pair of axes and a fourth arm on the other of said second pair of axes; a third eccentric weight mounted on said third arm and a fourth eccentric weight equal to said third eccentric weight mounted on said fourth arm; means to counter rotate the axes of each pair and means to rotate the axes of said first pair at a frequency different from a rotational frequency of said second pair; and a rigid base member rigidly supporting each pair of axes.

16. A seismic waveform generator comprising in combination: a plurality of pairs of rotatable eccentric weights, each pair having substantially parallel axes in substantially a horizontal plane; a rigid base member rigidly supporting the axis of rotation of each eccentric weight; means to counter rotate the eccentric weights of each said pair at a frequency different from the rotational frequency of each of the other pairs.

17. An apparatus as described in claim 16 in which the difference in rotational frequency between successive frequencies is constant.

18. A system for producing a composite seismic waveform having $n$ harmonic components, each component having a known phase, frequency and amplitude which comprises in combination: $n$ pairs of rotatable eccentric weights representing each harmonic component and having axes of rotation in substantially the same horizontal plane, and the axis of rotation of each eccentric weight of each pair being substantially parallel to each other, and arranged such that the plane of the rotation of eccentric weights in each pair being substantially the same; means to counter rotate the eccentric weights of each pair; means to rotate each pair of eccentric weights at the frequency and phase of the harmonic component it represents, which frequency is different from the frequencies of the other pairs of rotatable eccentric weights; a rigid base member; and means to support each said pair of eccentric weights such that the axes of such weights are fixed with respect to said base member.

References Cited by the Examiner
UNITED STATES PATENTS 2,745,507   5/56   Bodine _____ 181—.53
2,910,134   10/59   Crawford et al. _____ 181—.53

SAMUEL FEINBERG, *Primary Examiner.*

C. W. ROBINSON, CHESTER L. JUSTUS, *Examiners.*